US008264538B2

(12) United States Patent
Horbruegger et al.

(10) Patent No.: US 8,264,538 B2
(45) Date of Patent: Sep. 11, 2012

(54) OPTICALLY MONITORING COMB-LINE OF ESCALATORS AND MOVING WALKS

(75) Inventors: Herbert Horbruegger, Berlin (DE); Reinhard Henkel, Berlin (DE)

(73) Assignee: Otis Elevator Company, Farmington, CT (US)

( * ) Notice: Subject to any disclaimer, the term of this patent is extended or adjusted under 35 U.S.C. 154(b) by 1166 days.

(21) Appl. No.: 12/066,888

(22) PCT Filed: Sep. 16, 2005

(86) PCT No.: PCT/EP2005/010007

§ 371 (c)(1), (2), (4) Date: Mar. 14, 2008

(87) PCT Pub. No.: WO2007/031106

PCT Pub. Date: Mar. 22, 2007

(65) Prior Publication Data

US 2008/0252724 A1 Oct. 16, 2008

(51) Int. Cl.
*H04N 7/18* (2006.01)

(52) U.S. Cl. .......................................... 348/143; 348/80

(58) Field of Classification Search .................... 348/80, 348/143

See application file for complete search history.

(56) References Cited

U.S. PATENT DOCUMENTS

| | | | | |
|---|---|---|---|---|
| 5,852,902 | A * | 12/1998 | Hopper, II | 52/177 |
| 6,272,244 | B1 * | 8/2001 | Takahashi et al. | 382/190 |
| 6,982,922 | B2 * | 1/2006 | Stark | 365/233.11 |
| 7,283,656 | B2 * | 10/2007 | Blake et al. | 382/137 |
| 2002/0191819 | A1 | 12/2002 | Hashimoto et al. | |
| 2010/0282570 | A1 * | 11/2010 | Matheisl et al. | 198/333 |

FOREIGN PATENT DOCUMENTS

| | | | |
|---|---|---|---|
| DE | 10219483 | A1 | 11/2003 |
| JP | 4040593 | | 2/1992 |
| JP | 200211873 | A | 8/2000 |
| JP | 2004224560 | A | 8/2004 |
| JP | 2006027790 | | 2/2006 |

OTHER PUBLICATIONS

Pietz(DE patent # 10,219,483) Abstract from Derwent(attached).*
International Search Report and Written Opinion of the International Searching Authority for PCT/EP2005/010007 mailed Apr. 27, 2006.
International Preliminary Report on Patentability for International Application No. PCT/EP2005/010007 mailed Jan. 17, 2008.

* cited by examiner

*Primary Examiner* — Tammy Nguyen
(74) *Attorney, Agent, or Firm* — Carlson, Gaskey & Olds PC

(57) ABSTRACT

Method for monitoring at least part of a comb-line (18) of a comb plate (14) having a plurality of teeth (16), of a people conveyor (2) having a movable transportation band (4) and the comb plate (14) located at the transition (20) between the movable transportation band (4) and the stationary comb plate (14), wherein the method includes (a) taking a picture of the comb-line (18) with a camera (12); (b) comparing the picture with a reference picture; (c) determining the safety state of the comb-line (18) based on such comparison.

14 Claims, 3 Drawing Sheets

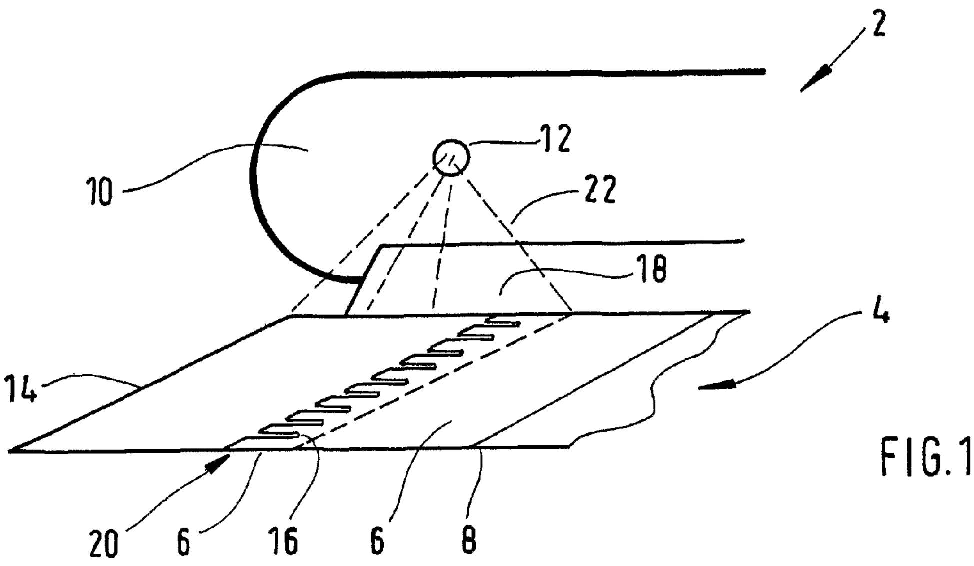
FIG.1
FIG.5
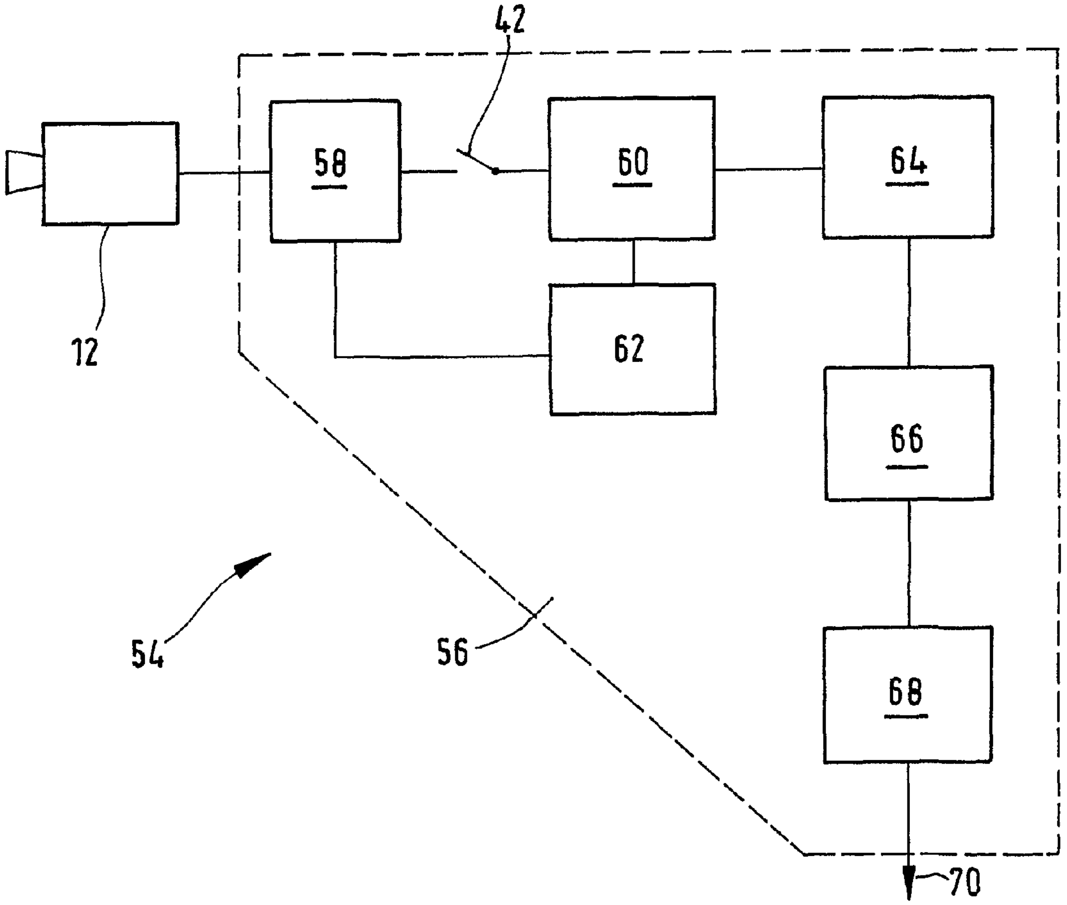

OPTICALLY MONITORING COMB-LINE OF ESCALATORS AND MOVING WALKS

The present invention relates to the monitoring of at least part of a comb-line of a comb plate having a plurality of teeth, of a people conveyor having a movable transportation band and the comb plate which is located at the transition between the movable transportation band and the stationary comb plate.

It is known that people conveyor like escalators and moving walkways have an endless transportation band which moves along an endless path through an exposed area where the transportation band is exposed to transport the passenger, a turnaround area, and a return path as well as a further turnaround area which closes the endless path to the exposed area. The transportation band can be formed from a plurality of individual tread elements like steps and pallet. Alternatively, the transportation band can be an elastic endless belt.

For security reasons the disappearing area, where the moving transportation band disappears under the stationary landing area of the people conveyor is of highest concern. Particularly, high efforts are taken to keep the gap between the moving transportation band and the stationary structure as small as possible. To this end, the transportation band frequently has a cleated surface, while the corresponding stationary structure has a comb-like shape with the individual teeth of the comb extending into the groves between adjacent cleats on the transportation band surface. The individual teeth are tapered so as to urge any objects away from the disappearing transportation band. However, there is the risk of tooth-breaking, for example the European product standard code requires periodic inspection and test, to ascertain the proper condition of the comb. Particularly, there are requirements to check the comb plate for a broken tooth once a day and to shut down the people conveyor, once two adjacent teeth are broken. While this check is typically being performed by operating personnel of the people conveyor, there is a tendency to automatically perform monitoring of the teeth of the comb plate. Several approaches have been suggested for automatically monitoring the comb plate and particularly monitoring if two adjacent teeth are missing. US 2004/0035675 A1 discloses to provide conductors for each individual tooth so that a conductor will break if a tooth breaks. The conductors are connected to a control unit which allows for assessing if only a single or two adjacent teeth are broken. DE 102 23 393 A1 suggests, on the other hand, to monitor the comb plate with a laser distance measuring device. Those approaches are relatively complicated and expensive to implement.

It is the object of the present invention to provide a method and an apparatus for monitoring comb plate teeth which is reliable, easy to install with existing installations and cost-efficient.

In accordance with the present invention, this object is solved by the following steps:

(a) taking a picture of the comb-line with a camera;
(b) comparing the picture with a reference picture;
(c) determining the safety state of the comb-line based on such comparison.

Electrical cameras and particularly digital cameras, and image processing units are readily available at relatively low cost. They have proven to be reliable enough to be used for monitoring the comb plate or, better to say the comb-line, for broken teeth. The method may comprise taking a picture and making the determination on the basis of a single picture, for example once or several times a day, for example in the morning, or before the people conveyor starts operating. It is also possible to make the determination on the basis of a plurality of pictures. It is also possible to take pictures at certain intervals, for example every hour, every thirty minutes, every second, etc. It is also possible to form an image processing on any picture taken before comparing it with a reference picture. Image processing can also be performed only after the comparing step.

The picture-taking step can include taking a plurality of pictures, sampling pictures at intervals or continuously. It is possible to compare each single picture with a reference picture or to combine/integrate a plurality of pictures and to compare the integrated pictures with the reference picture.

It is possible to bring out or carve out the static comb-line from the picture by pattern filtering the picture. The pattern filtering can be performed by taking into account specific information about the comb-line, for example orientation of teeth, dimension of teeth, number of teeth, spacing between teeth, the particularly related section of the picture, etc.

The step of comparing the picture with the reference picture can include subtracting the pictures from each other. By doing so the result can be merely the difference between the pictures, i.e. a missing tooth, etc. It can be preferred to have a reference picture in which the same or corresponding pattern filtering steps have been performed as the pattern filtering steps performed with the picture taken in order to provide for very closely corresponding pictures to be compared with each other or be subtracted from each other.

The picture-taking steps can include taking pictures independent of the traffic situation, which exists on the movable transportation band, and preferably performing an interference elimination by correlating a plurality of pictures. Alternatively, it is possible to monitor whether people are present on the people conveyor or next to the comb-line and to take pictures only if no people or objects are present.

The interference elimination can comprise autocorrelating a plurality of individual comparisons of pictures with the reference picture. By doing so the pictures are first taken and subsequently individually compared with the reference picture in the next step, a plurality of individual comparison results are compared with each other and any temporary interference is taken out of consideration. This can be done by not at all using a picture including an interference, but is preferably done by using only those portions of the picture where there is no interference, i.e. by using the clearly visible portion of the comb plate only.

It is further possible to calculate a stability grade reflecting the reliability of the comparison result after interference elimination and preferably to determine the safety state only if a required level of stability grade has been reached.

The reference picture can be a picture which was taken by the camera which also takes the pictures to be compared.

The present invention further refers to a comb teeth monitoring device for monitoring at least the part of a comb-line of a people conveyor having a movable transportation band and a comb plate which is located at the transition between the movable transportation band and the stationary comb plate wherein the comb plate has a plurality of teeth forming the comb-line, comprising a camera and a memory for storing a reference picture of a comb-line, a comparison unit for comparing a picture taken by the camera with a reference picture and a determining unit for determining the safety state of the comb-line based on the comparison. The determining unit can be adapted to determine either of a safe or an unsafe condition and can be connected to the people conveyor control so as to stop the people conveyor once an unsafe condition has been determined. It is also possible to stop the people conveyor only if a subsequent separate test confirms an unsafe condition. It is also possible that the determining unit is adapted to provide at least one additional warning state between the safe and the unsafe condition, for example if a single tooth or two teeth, which are not adjacent, are broken.

The comb teeth monitoring device may further comprise a pattern-filtering unit. The comparison unit may comprise a subtracting unit for subtracting the reference picture and the picture taken by the camera from each other. The comb teeth monitoring device may further comprise an interference elimination unit operatively connected to a memory for correlating a plurality of pictures taken by the camera with each other. The comb teeth monitoring device may further include a reference picture button for storing into the memory a picture taken by the camera. The reference picture button can be a reset button or a refresh button and can be a physical feature of the monitoring device itself. Alternatively, it can be connectable to the monitoring device as part of a service tool like a service laptop, etc.

A further embodiment of the present invention relates to a people conveyor having a comb teeth monitoring device as disclosed above. A camera can be located above and lateral to the comb-line. Preferably, the people conveyor includes a balustrade lateral to the transportation band, wherein the camera is located within the balustrade above and laterally to the comb-line.

The camera can further be located below the comb plate and the tread elements so that it takes and uses the pictures through the gap between adjacent tread elements.

While having a camera located in the balustrade, it is readily accessible for maintenance operation, etc., locating the camera below the comb plate has the advantage of having the camera securely hidden against vandalism.

Embodiments of the present invention will be described below with respect to the drawings in which:

FIG. 1 shows a part of a people conveyor embodying the present invention;

FIG. 2*a* to 2*c* schematically show a comb plate without and with defects;

FIG. 3 schematically shows a comb plate error detection by comparing an image as taken by the camera with a reference picture;

FIG. 5 is a schematic representation of a comb teeth monitoring device.

Figure 2C:
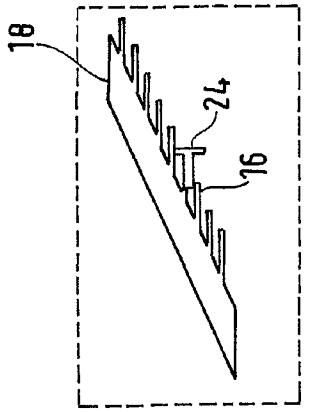

FIG. 1 shows a people conveyor 2 having a movable transportation band 4 which is formed of a plurality of tread elements 6 arranged one after the other leaving a gap 8 between adjacent tread elements 6. The people conveyor 2 further comprises a balustrade 10 having a camera 12 of a comb teeth monitoring device located therein. The people conveyor 2 further comprises a stationary comb plate 14 with teeth 16 at its end facing toward the transportation band 4. The teeth 16 and the foremost portion of the comb plate 14 together form the comb-line 18. The comb-line 18 forms the transition 20 from the moving transportation band 4 to the stationary comb plate 14.

Dashed lines 22 schematically show the dimension of the picture as taken by the camera 12.

Figure 2B:
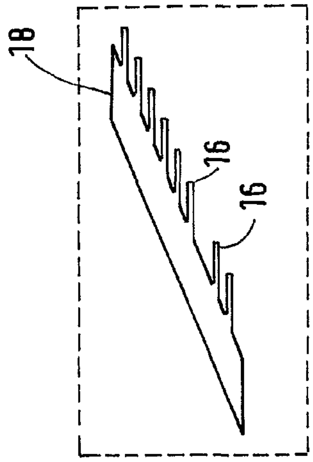
Figure 2A:
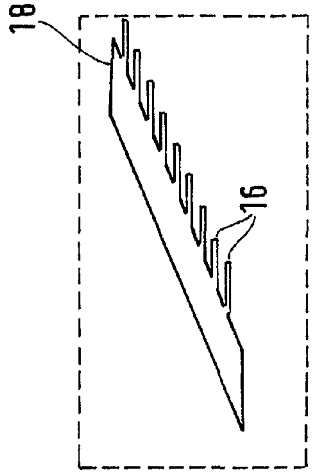

FIG. 2*a* schematically shows an image of the comb-line 18, clearly showing the individual teeth 16 arranged in parallel to each other and with a predetermined spacing between each other. FIGS. 2*b* and 2*c* are perspective Figures corresponding to FIG. 2*a* with FIG. 2*b*, however, showing a missing tooth between the second and fourth teeth 16 as counted from left to right in FIG. 2*b*. Similarly, FIG. 2*c* shows a comb-line 18 with an object 24 being trapped between two adjacent teeth. The conditions as shown in FIGS. 2*b* and 2*c* are merely two exemplary defect conditions. Other defect conditions are two or more missing teeth, particularly two adjacent missing teeth and an upwardly tilted comb plate or a comb-line having the tips of the comb lifted upwards, etc.

Figure 3:
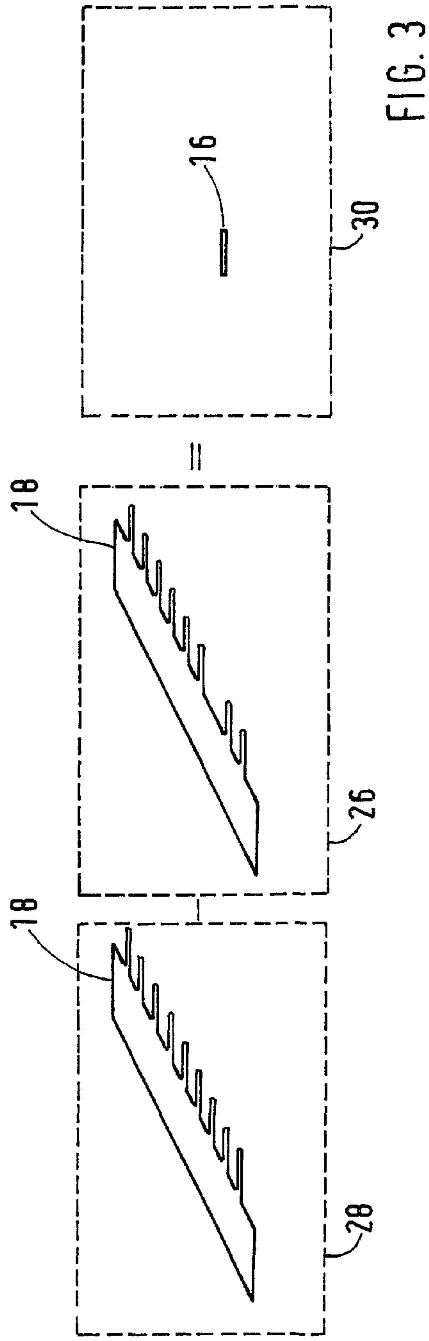

FIG. 3 shows the basic concept of subtracting from a reference picture 28 a picture 26 of the comb-line 18 as taken by the camera of the corresponding comb-line 18. As can be seen in picture 30, the result is merely the lacking tooth 16.

Figure 4:
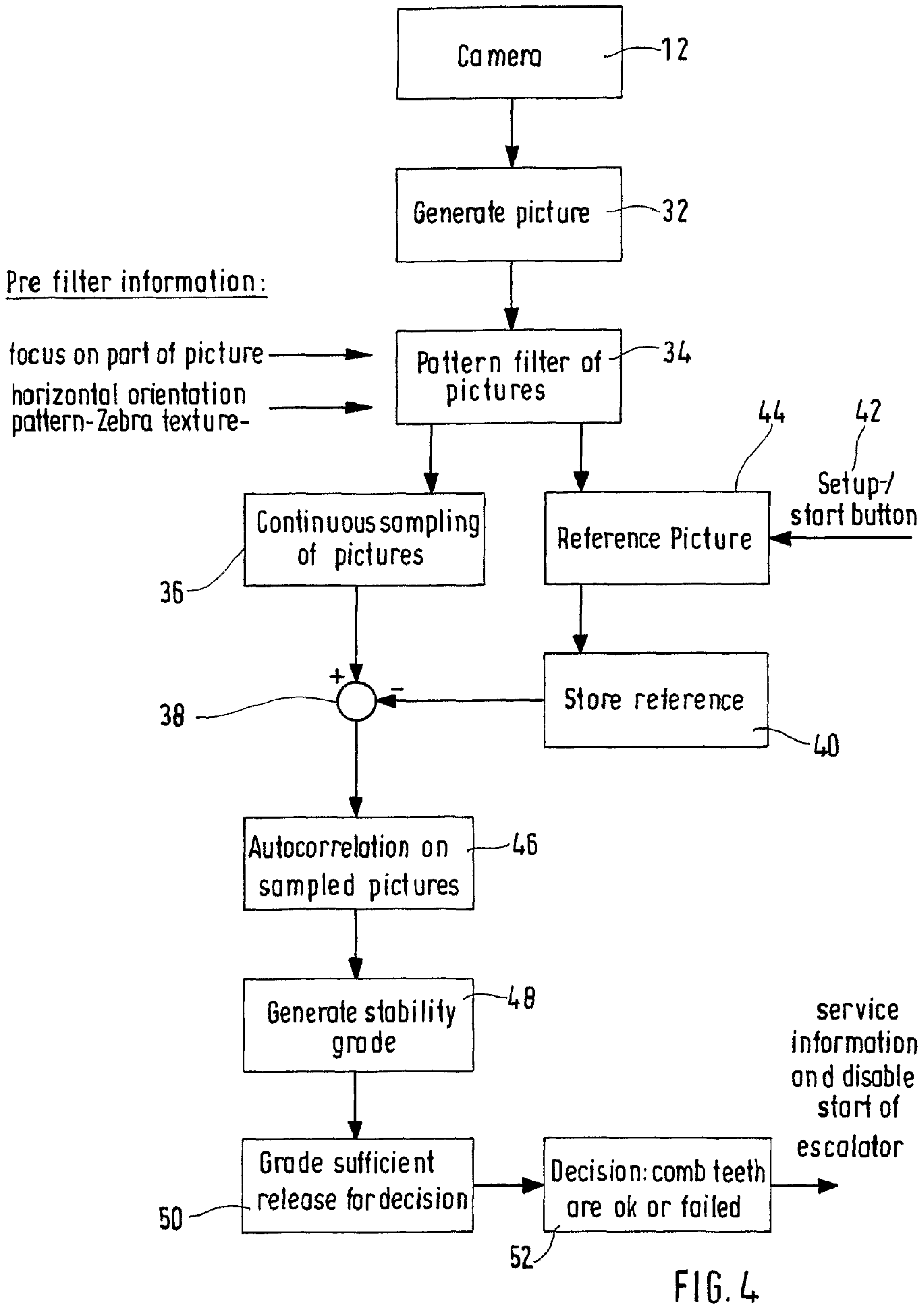
FIG. 4 is a logic diagram showing the monitoring method.

The logic sequence of FIG. 4 explains the monitoring method in more detail. The camera 12 takes a picture in step 32. The picture taken in step 32 is forwarded to step 34 for performing pattern filtering of the respective picture. The filtering of the pictures can be performed by pattern filtering based on the information as given in the picture itself. On the other hand, particularly in the present situation such pattern filtering can be enhanced or facilitated by using particular information on the pattern to be recognized in the particular picture at hand. For example the parallel orientation of the teeth 16 of the comb-line 18 can be used for facilitating pattern recognition and pattern filtering. Once the target pattern is recognized in the picture, it is possible to focus on the pattern of interest, i.e. the comb-line 18. The focusing can be done by adjusting the orientation of the camera, but preferably it is done by focusing on the relevant portions of the pictures taken by the camera. Particularly it is possible to select a very narrow portion of the picture only and to ignore the remaining information on the picture as taken.

As indicated in step 36, it is possible to continuously sample the pictures. In step 38 each individual picture or a combination of a plurality of sampled pictures can be compared with a reference picture, which has been stored in step 40. The comparison in step 38 can for example be performed by subtracting from the reference picture the picture as taken, as shown in FIG. 3.

It is possible to take the reference picture with the same camera 12 and to have the reference picture processed in the same way as the processing of other pictures taken is performed in steps 32 and 34. If a reference picture is selected, for example by the set-Up start button 42 in step 44, the respective reference picture can be stored in step 40 in a memory.

In order to allow for a continuous monitoring of the comb-line 18 independent of the traffic condition on the transportation band 4, an interference elimination step will be performed. In accordance with the embodiment shown in FIG. 4, such interference elimination is performed in step 46 where the pictures as taken and as individually compared with the reference picture in step 38 are automatically correlated with each other in order to particularly eliminate temporarily appearing interference like passengers or objects moving on the transportation band. Alternatively it is possible not to perform the interference elimination after individually comparing each picture as taken by the camera 12 with the reference picture, but to perform the interference elimination before the comparison with the reference picture is performed.

In step 48 a so-called stability grade will be calculated, which indicates the quality of the elimination of the disturbances as performed. This stability grade will target to a limiting value because there is only a limited number of pictures to be expected: either the comb-line 18 is complete (FIG. 2*a*), or one tooth or more teeth are missing (FIG. 2*b*), or an object has jammed into the comb-line 18 (FIG. 2*c*). The stability grade can be based on the number of pictures to be taken into account. The number of disturbances which have been eliminated, the number of repetitions of the monitoring process which confirm a particular condition, etc. Once the stability grade is sufficient, which can be performed in step 50 by comparing the calculated stability grade with a predetermined value, the result of the monitoring can be released to a decision step 52 or determining step 52 which determines the safety state of the comb-line 18. The determination as made in step 52 can be input to the people conveyor control (not shown) for stopping the conveyor, for indicating a warning signal, for indicating a maintenance signal, etc., or can be directly linked to a supervising office for starting service operation.

It is possible to determine the type of fault as detected e.g. by the method as shown in FIG. 4 by comparing the pictures as taken with the result of the comparison in step 38 with fault reference pictures in order to identify particular fault conditions and to generate an issue different warning or stop information.

FIG. 5 shows a comb teeth monitoring device 54 for monitoring at least part of the comb-line 18 of the people conveyor 2. Particularly, the comb teeth monitoring device 54 comprises a camera 12 and an image processing unit 56. The image processing unit 56 comprises a pattern filtering unit 58, a memory 60, a comparison unit 62. A reference picture button 42 serves for storing a reference picture in the memory 60. An interference unit 64 directly or indirectly through memory 60 receives the results from the comparison unit 62 and eliminates any interference as discussed above with respect to step 46. A reliability calculation unit 66 provides for sending only reliable information to a determining unit 68. The output 70 from the determining unit can be input to the people conveyor control, etc.

The invention claimed is:

1. A method for monitoring at least part of a comb-line of a people conveyor having a movable transportation band with a plurality of tread elements and a gap between adjacent tread elements and the comb plate located at a transition between the movable transportation band and a stationary surface, the comb plate having a plurality of teeth, wherein the method includes:

(a) taking a picture of the comb-line with a camera that is positioned below the comb plate and bringing out the static comb-line of the picture by pattern filtering the picture;

(b) comparing the pattern filtered picture with a reference picture;

(c) determining a state of the comb-line based on the comparing.

2. A method according to claim 1, wherein the picture-taking step includes taking a plurality of pictures.

3. A method according to claim 1, wherein the pattern filtering is performed by taking into account specific information about the comb-line.

4. A method according to claim 3, wherein the specific information includes at least one of: orientation of teeth, dimension of teeth, number of teeth, spacing between teeth or a related section of the picture.

5. A method according to claim 1, wherein the step of comparing the pattern filtered picture with the reference picture includes subtracting the pictures from each other.

6. A method for monitoring at least part of a comb-line of a people conveyor having a movable transportation band and the comb plate located at a transition between the movable transportation band and a stationary surface, the comb plate having a plurality of teeth, wherein the method includes:

(a) taking a picture of the comb-line with a camera and bringing out the static comb-line of the picture by pattern filtering the picture;

(b) comparing the pattern filtered picture with a reference picture;

(c) determining a state of the comb-line based on the comparing, wherein the picture-taking step includes taking a plurality of pictures independent of a traffic situation on the movable transportation band, and performing an interference elimination by correlating the plurality of pictures.

7. A method according to claim 6, wherein the interference elimination comprises:

comparing each of the plurality of pictures with the reference picture resulting in a plurality of individual comparisons;

autocorrelating the plurality of individual comparisons by comparing results of the individual comparisons against each other to identify any interference in any of the plurality of pictures; and identifying any of the plurality of pictures that include interference resulting from an object in view of the camera when a corresponding one of the pictures was taken.

8. A method according to claim 6, including calculating a stability grade reflecting the reliability of the comparison result after interference elimination, and determining the state only if a required level of stability grade has been reached.

9. A method according to claim 1, wherein the reference picture is a picture taken by the camera positioned beneath the comb plate.

10. A comb teeth monitoring device for monitoring at least part of a comb-line of a people conveyor having a movable transportation band with a plurality of tread elements and a gap between adjacent tread elements and a comb plate located at a transition between the movable transportation band and a stationary surface, wherein the comb plate has a plurality of teeth forming the comb-line, comprising:

a camera positioned below the comb plate to take a picture of the comb plate through the gap;

a memory for storing a reference picture of the comb-line;

a pattern filtering unit for filtering a picture taken by the camera;

a comparison unit for comparing a picture taken by the camera with the reference picture; and a determining unit for determining a state of the comb-line based on the comparison of the comparison unit.

11. A comb teeth monitoring device according to claim 10, wherein the comparison unit comprises a subtracting unit for subtracting from each other the reference picture and the picture taken by the camera.

12. A comb teeth monitoring device according to claim 10, including an interference elimination unit associated with the determining unit, the interference elimination unit correlating with each other a plurality of pictures taken by the camera.

13. A comb teeth monitoring device according to claim 10, including a reliability calculation unit operatively connected to the determining unit.

14. A comb teeth monitoring device according to claim 10, including a reference picture button associated with at least one of the camera or the memory for storing a picture taken by the camera into the memory.

* * * * *